US011458378B2

(12) United States Patent
Strickland

(10) Patent No.: US 11,458,378 B2
(45) Date of Patent: Oct. 4, 2022

(54) BASEBALL SIMULATION AND GAMIFICATION SYSTEM

(71) Applicant: Marcus-Tor Strickland, Lawrenceville, GA (US)

(72) Inventor: Marcus-Tor Strickland, Lawrenceville, GA (US)

( * ) Notice: Subject to any disclaimer, the term of this patent is extended or adjusted under 35 U.S.C. 154(b) by 698 days.

(21) Appl. No.: 15/588,620

(22) Filed: May 6, 2017

(65) Prior Publication Data

US 2017/0326458 A1 Nov. 16, 2017

Related U.S. Application Data

(60) Provisional application No. 62/334,366, filed on May 10, 2016.

(51) Int. Cl.

| | |
|---|---|
| ***A63F 13/812*** | (2014.01) |
| ***A63B 69/00*** | (2006.01) |
| ***A63B 69/40*** | (2006.01) |
| ***A63B 71/06*** | (2006.01) |
| ***A63B 24/00*** | (2006.01) |

(52) U.S. Cl.

CPC ...... *A63B 69/0002* (2013.01); *A63B 24/0087* (2013.01); *A63B 69/40* (2013.01); *A63B 71/0622* (2013.01); *A63B 71/0669* (2013.01); *A63B 2069/0006* (2013.01); *A63B 2069/0008* (2013.01); *A63B 2069/0011* (2013.01); *A63B 2071/0625* (2013.01); *A63B 2220/12* (2013.01); *A63B 2220/20* (2013.01); *A63B 2220/30* (2013.01); *A63B 2220/35* (2013.01); *A63B 2220/40* (2013.01); *A63B 2220/53* (2013.01); *A63B 2220/806* (2013.01); *A63B 2220/807* (2013.01); *A63B 2220/808* (2013.01); *A63B 2225/20* (2013.01); *A63B 2225/50* (2013.01); *A63B 2225/54* (2013.01); *G08C 2201/93* (2013.01)

(58) Field of Classification Search

CPC ................ A63F 13/812; A63F 69/0002; A63F 2069/0006; A63F 2069/0008; A63B 69/0002; A63B 2069/0006; A63B 2069/0008; A63B 2024/0028; A63B 2024/0034

See application file for complete search history.

(56) References Cited

U.S. PATENT DOCUMENTS

| | | | | |
|---|---|---|---|---|
| 5,897,445 A * | 4/1999 | Sanders ............ | A63B 24/0003 473/421 |
| 7,052,391 B1 * | 5/2006 | Luciano, Jr. ....... | A63B 24/0021 463/3 |
| 2003/0051718 A1 * | 3/2003 | Battersby .......... | A63B 69/0002 124/78 |
| 2009/0170642 A1 * | 7/2009 | Ono .................. | A63B 24/0021 473/455 |

(Continued)

*Primary Examiner* — Omkar A Deodhar

(57) ABSTRACT

An interactive baseball gamification system can be facilitated via the use of sensors, data tracking, gamification, and virtualization. A first user can play against a second user in real-time, near real-time, or based on historical user data. Additionally, the first user can be geographically remote from the second user. The interactive baseball gamification system can be used to train baseball players or baseball teams. Alternatively, the interactive baseball gamification system can be used for recreational purposes to pit users against each other.

20 Claims, 12 Drawing Sheets

(56) References Cited

U.S. PATENT DOCUMENTS

| | | | | | |
|---|---|---|---|---|---|
| 2012/0179277 | A1* | 7/2012 | Lymberopoulos | A63B 71/0616 | 700/91 |
| 2013/0310958 | A1* | 11/2013 | Sanchez | A63B 24/0062 | 700/91 |
| 2014/0277636 | A1* | 9/2014 | Thurman | A63B 71/0605 | 700/91 |
| 2015/0260512 | A1* | 9/2015 | Greiner | A63B 71/0616 | 702/150 |
| 2015/0306455 | A1* | 10/2015 | DeCarlo | A63B 24/00 | 473/422 |
| 2017/0304705 | A1* | 10/2017 | Hermandorfer | A63B 71/02 | |

* cited by examiner

BASEBALL SIMULATION AND GAMIFICATION SYSTEM

CROSS-REFERENCE TO RELATED APPLICATION

The subject patent application claims priority to U.S. Provisional Patent Application No. 62/334,366, filed May 10, 2016, and entitled "Baseball Simulation & Gamification System." The entirety of the aforementioned application is hereby incorporated by reference herein.

TECHNICAL FIELD

This disclosure relates generally to facilitating an interactive baseball gamification. For example this disclosure relates to a virtual reality system for baseball gamification.

BACKGROUND

Baseball is a game that relies heavily on statistics. Statistics are used to assess a player's skill and are reviewed in great detail when determining if the player is able to reach higher levels of expertise. A player's ability to improve his performance and the associated statistics over the course of a season or career will greatly enhance the probability of his success at a variety of levels. Additionally, the ability to gamify and simulate certain baseball environments can assist in development of baseball players and their skill sets. With respect to various baseball practice components, conventional indoor baseball facilities offer year round clinics utilizing batting cages and pitching machines to improve the players' swing mechanics, bat speed, and ability to hit the ball on the sweet spot of the bat. As a result, the dedicated baseball facilities can help to improve the players' batting average.

The above-described background relating to a baseball facilities is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
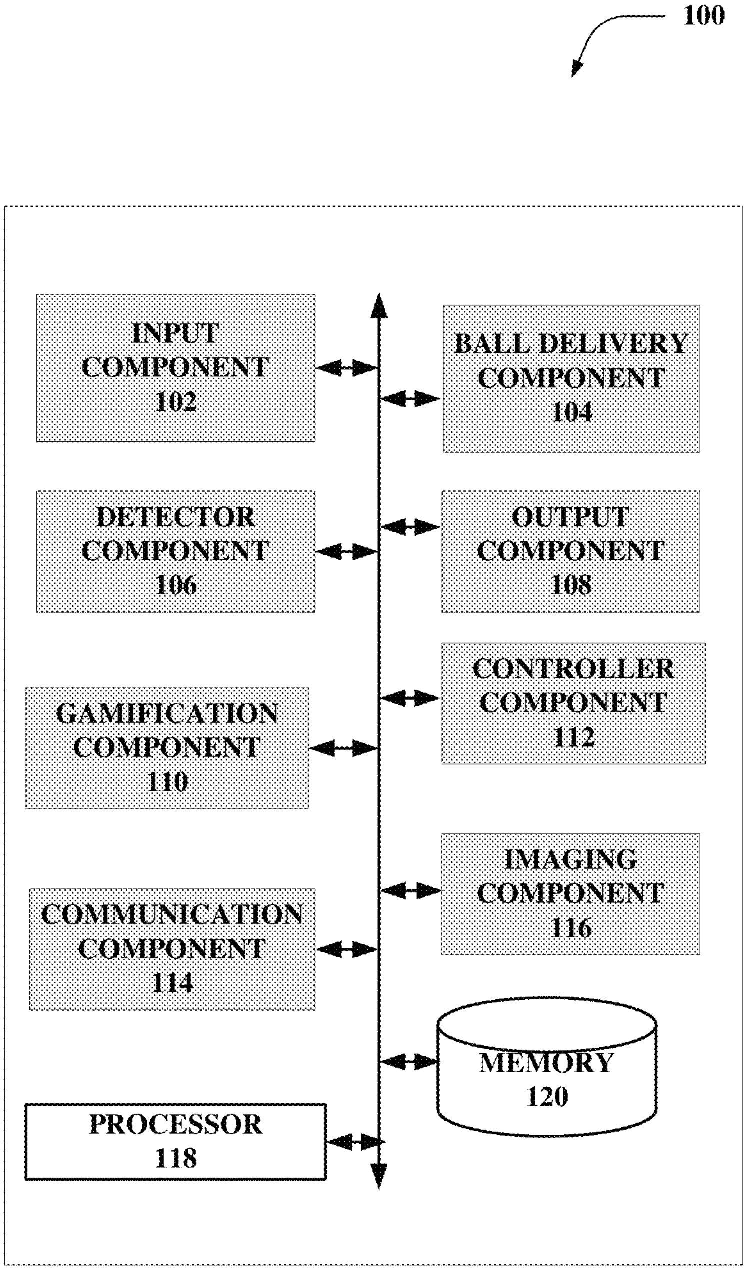
FIG. 1 illustrates an example block diagram of an example of a baseball gamification system according to one or more embodiments.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate interactive baseball gamification between mobile devices and network devices.

For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

Described herein are systems, methods, articles of manufacture, and other embodiments or implementations that can facilitate interactive baseball gamification. Facilitating the interactive baseball gamification can be implemented in connection with any type of device with a connection to the communications network such as: a mobile handset, a computer, a handheld device, or the like.

The interactive baseball gamification system can be housed within a baseball or baseball like facility with multiple bays suited for various purposes (e.g., pitching bay, hitting bay, catching bay). Each bay can also have certain safety precautions. For instance, if the hitting bay active area door is opened during pitch initiation, the system can fault into an emergency stop state and can reset once the door is closed. The pitching motion can then be reactivated based on a sensor status.

The interactive baseball system can comprise several components to facilitate an imitated baseball game. A radio frequency identification (RFID) device can be used to track baseballs and their location. The baseball location and/or statistical data associated with a hit, pitch, and/or catch of the baseball can be displayed on any device with a display screen (e.g., television, computer, monitor, mobile phone, etc.). It should be noted that any type of tracking system can be used (e.g., zigbee, Bluetooth, global positioning system (GPS), etc.). Additionally, a baseball field can be configured to assist in baseball tracking. A baseball pitching machine can also be used in conjunction with the interactive baseball system.

Additionally, the baseball field itself can be set-up to capture baseballs and feed the baseballs back to pitching machines within the facility for reuse. The capture process can comprise conveyor belts, sensors, inclines/declines to facilitate ball rolls, field baseball repositories, etc. Aside from location monitoring of the baseball's landing (e.g., via GPS, video, sensors, etc.) the field can be instrumental in providing route data. For instance, if the ball is initially hit into center field but then rolls into left field. The baseball field can generate data associated with the rolling of the baseball from center field into left field. It should also be noted that the baseball field can be constructed to facilitate a point system. For instance, a user can receive more points for hitting a homerun and less points for hitting infield. Additionally, the baseball field can be segmented to provide additional granularity as it relates to training and practice. For instance, a gamification component can allow a user to select right field as the preferred target field area. Therefore, the user can receive more points by hitting the baseball into right field. The gamification component can randomize the target field areas, allow the user to select the target field areas, and/or allow another user to select the target field areas. The gamification component can also generate the target field areas based on previously acquired data. For instance a first user hits into left field, so the second user must hit into left field, and so on.

In one embodiment a hitting bay can comprise a baseball pitching matching situated to pitch a baseball to a first user to hit. The pitching machine can be in the center of the field of play allowing for service to multiple bays form a central location. The automated pitching machine can pitch both overhand toss (baseball) and underhand toss (softball) at varying speeds. It should be noted that hitters can have the choice to either hit active balls thrown from the automated pitching machine, or off hitting tees. The first user can select the type of pitch he would like to receive. For instance, if the first user would like to receive a fastball, then the first user to prompt the baseball pitching machine to pitch a fastball. Since the first user can prompt the pitching machine from a distance to ensure user safety, a monitor, a control station, a computer, and/or a mobile device can be configured to allow the first user to remotely prompt the pitching machine. For instance, the first user can access a mobile application that can allow the first user to select a fastball pitch to receive from the baseball pitching machine. It should also be noted that the first user can pre-select a pitch line-up to be pitched during the first user's session in the hitting bay.

In another embodiment, the pitching from the pitching machine can be automated, simulated, and/or based on a randomized nomenclature. A simulated pitch can take into account historical data based on the first user's and/or a second user's pitch technique. For instance, if the second user throws a 90 mile per hour (MPH) curveball, then pitch data (velocity, acceleration, trajectory, top speed, spin, drop/curve/rise angle, placement (pitch), loft (softball pitch), bat speed, swing angle, and release height/position, etc.) can be captured (e.g., by video, sensor technology, GPS, etc.), wherein the pitching machine can simulate the pitch based on the pitched data. Consequently, if the first user selects a pitch based on the second user's pitching data, then the first user will receive a 90 MPH curveball based on the second user's pitching data and/or pitching history. It should also be noted that this scenario can happen in near real-time.

In a near real-time scenario the second user can be in a pitching bay where pitch data (velocity, acceleration, trajectory, top speed, spin, drop/curve/rise angle, placement (pitch), loft (softball pitch), bat speed, swing angle, and release height/position, etc.) on each of his pitches is being captured and sent over to the hitting bay pitching machine. Based on the pitch data, the pitching machine can then simulate the type of pitch pitched by the second user in near real-time. Thus the first user can swing at a pitched baseball simulated from pitch data of the second user, thereby allowing the first user (the hitter) and the second user (the pitcher) to practice together even if they are located in separate bays. Additionally, the same type of integrations between bays can exist between a hitting bay and a catching bay (infield and/or outfield) and/or a pitching bay and catching bay to simulate catcher training.

In yet another embodiment, the first user can see a virtualized image of the second user to increase the realistic affect of the users actually practicing in the same bay. For instance a live video image (or near-live) of the second user can be shown the first user where the pitching machine can pitch the baseball in accordance with the video image of the second user. Conversely, the second user can see a virtualized image or video image of the first user as he hits the pitched baseball.

In another embodiment, each user can have a user profile, which displays historical data based on the user's performance during a hitting, pitching, and/or catching session. The user profile can be used to pit friends, teammates, and other persons against each other. For instance, the second user's pitching profile data generated from a location in Georgia can be accessed and downloaded for another user to bat against in a hitting bay which is in California. Thus, two users who are geographically remote to each other can play against each other, either in near real-time as noted above, and/or during different time frames altogether. The user profiles can be accessed by any device with a communication to a wireless network (e.g., mobile device, computer, television, etc.). To facilitate registration, user profile data can comprise: name, height, date of birth (DOB), and mobile number.

It should also be noted that an artificial intelligence (AI) component can facilitate automating one or more features in accordance with the disclosed aspects. A memory and a processor as well as other components can include functionality with regard to the figures. The disclosed aspects in connection with facilitation of interactive baseball gamification can employ various AI-based schemes for carrying out various aspects thereof. For example, a process for detecting one or more trigger events, reducing a pitch speed as a result of the one or more trigger events, and modifying one or more reported measurements, and so forth, can be facilitated with an example automatic classifier system and process.

An example classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis baseball training statistics) to prognose or infer an action that can be automatically performed. In the case of interactive baseball gamification, for example, attributes can be a baseball speed, a baseball trajectory, and a baseball spin and the classes can be an output pitch value.

A support vector machine (SVM) is an example of a classifier that can be employed. The SVM can operate by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed. Classification as used herein also may be inclusive of statistical regression that is utilized to develop models of priority.

The disclosed aspects can employ classifiers that are explicitly trained (e.g., via a generic training data) as well as implicitly trained (e.g., via observing a user's swing as it relates to triggering events, observing a user's catch, observing a user's pitch, and so on). For example, SVMs can be configured via a learning or training phase within a classifier constructor and feature selection module. Thus, the classifier(s) can be used to automatically learn and perform a number of functions, including but not limited to modifying a transmit power, modifying one or more reported mobility measurements, and so forth. The criteria can include, but is not limited to, predefined values, frequency attenuation tables or other parameters, service provider preferences and/or policies, and so on.

In one embodiment, described herein is a method comprising receiving baseball identifier data associated with an identification of a baseball, and receiving first route data related to a defined first route of the baseball. The method can also comprise launching the baseball in accordance with the defined first route of the baseball. Additionally, the method can comprise tracking the baseball to a location by the identifier data, resulting in tracking data, and displaying location data associated with the location.

According to another embodiment, a system can facilitate, the receiving first identification data associated with a first baseball. Based on the first identification data, the system can identify the first baseball in response to receiving pitch data associated with the first baseball being determined to have been pitched. Additionally, the system can facilitate receiving second identification data associated with a second baseball, and launching the second baseball in accordance with the pitch data associated with the pitched first baseball. The system can facilitate tracking, by the second identification data, the second baseball to a location, and the system can facilitate displaying location data associated with the location of the second baseball.

According to yet another embodiment, described herein is a machine-readable storage medium that can perform the operations comprising receiving baseball identifier data associated with an identification of a baseball. The machine-readable storage medium can also perform the operations comprising receiving launch data associated with a launch of the baseball, launching the baseball in accordance with the launch data, and tracking the baseball to a first location by the identifier data, resulting in first tracking data. Additionally the machine-readable storage medium can perform the operations comprising tracking the baseball to a second location by the identifier data, resulting in second tracking data, and in response to tracking the baseball to a second location, the machine-readable storage medium can perform the operations comprising generating location data associated with the second location.

These and other embodiments or implementations are described in more detail below with reference to the drawings.

Referring now to FIG. 1, illustrated is an example block diagram of an example of a baseball gamification system according to one or more embodiments. The interactive baseball gamification system 100 can comprise various components (e.g., input component 102, ball delivery component 104, detector component 106, output component 108, gamification component 110, controller component 112, communication component 114, imaging component 116, etc.) and a processor 118 and memory 120. The various components of the interactive baseball gamification system can be communicatively coupled to each other. Repetitive description of like elements employed in other embodiments described herein is omitted for sake of brevity.

The input component 102 can be configured to receive inputs. The input can be transmitted from a mobile device, a computer, a monitor, etc. For example, if a user wants to pull up his previous batting history so that he can pick up where he left off, then the user can transmit his batter history data from his mobile device to the baseball gamification system 100 and the batter history data can be received by the input component 102. The ball delivery component 104 can be configured to deliver a baseball to a pitching machine to be pitched to the user. For example, the ball delivery component 104 can facilitate delivery of an RFID tagged baseball to the pitching machine to be pitched to the user. The detector component 106 can be configured to detect a location of the baseball as it exits the pitching machine, is hit by the user, and ends up at a location on the field. The detector component 106 can also be configured to detect various motions associated with the user's swing. For instance, a user's batting form (e.g., high, low, center, etc.) can be detected by the detector component 106 (e.g., video, RFID tag in/on the bat, accelerometer in/on the bat, gyroscope in/on the bat, etc.). The output component 108 can be configured to output data detected by the detector component 106. For instance, batting form data and/or pitch trajectory data can be transmitted by the output component 108 to the user's mobile device, a monitor, a computer, etc.

The gamification component 110 can be configured to pit a first user against a second user and/or pit a first group of users against second group of users. There can be various types of gamification. For example, if the first user can bat against a second users pitch even if they are in two different bays. A first user can bat against his own pitch, when the baseball gamification system has received, and/or stored in the memory 120, historical pitch data associated with the users previous pitches. Alternatively, an entire baseball team's defensive statistics can be used to gamify a session when the entire team is not present. For instance, if the Braves pitcher is known for pitching 50% fastballs, then if a user selects the Braves defense, he will be thrown 50% fastballs. Accordingly, if that same user bats the baseball into left field and left fielder of the Braves defense generally catches 33% of baseballs hit in the left field for an out, then 1 out of 3 of the user's baseballs hit into left field can be considered an out. Conversely, this same type of set-up can be facilitated by the gamification component 110 when the user is playing defense against offensive statistics of an individual or team. It should be understood that the baseball gamification system 100 can leverage previously stored data, real-time, and/or near real-time data to facilitate a gamified session. Additionally it should be noted that the statistical inputs related to a baseball teams performance can be input by a third-party, based on real game statistics, and/or generated to facilitate a specific outcome.

The controller component 112 can control the overall flow of the baseball gamification system 100. For instance, the controller component 112 can control which user is up to bat next, randomly select a defense for a user to play against, facilitate a point system, grant tokens of achievements, ratchet difficulty up or down, provide motivational text and/or audio. The communication component 114 can be configured to allow one bay to communicate with another bay. It should be noted that the bays may or may not be at the same geographic location. The communication component 114 can also allow users to communicate with each other via mobile devices, audio, visual, etc. For instance, if one user is batting in California and another user is pitching in Georgia during same session, then they can communicate via a live audio/visual connection to increase the realistic effect of the baseball gamification system 100. Alternatively, if a batter is batting against a previous pitching session of another user, then the other user can pre-record video and/or audio to be shown to the user during his session.

The imaging component 116 can be configured to provide images associated with specific baseball fields, weather conditions, level-up indicators, etc. For example, if a user would like to feel like he is practicing at Wrigley Field, then he can select Wrigley Field as his foreground visual and the imaging component 116 can show a visual of Wrigley Field. The imaging component 116 can also comprise display screens capable of facilitating the visual session between two or more users that are practicing against each other. The imaging component 116 can also provide visual displays of a baseballs trajectory, landing spot, location, etc. Furthermore, the processor 118 can be configured to facilitate the functions of the baseball gamification system 100.

Figure 2:
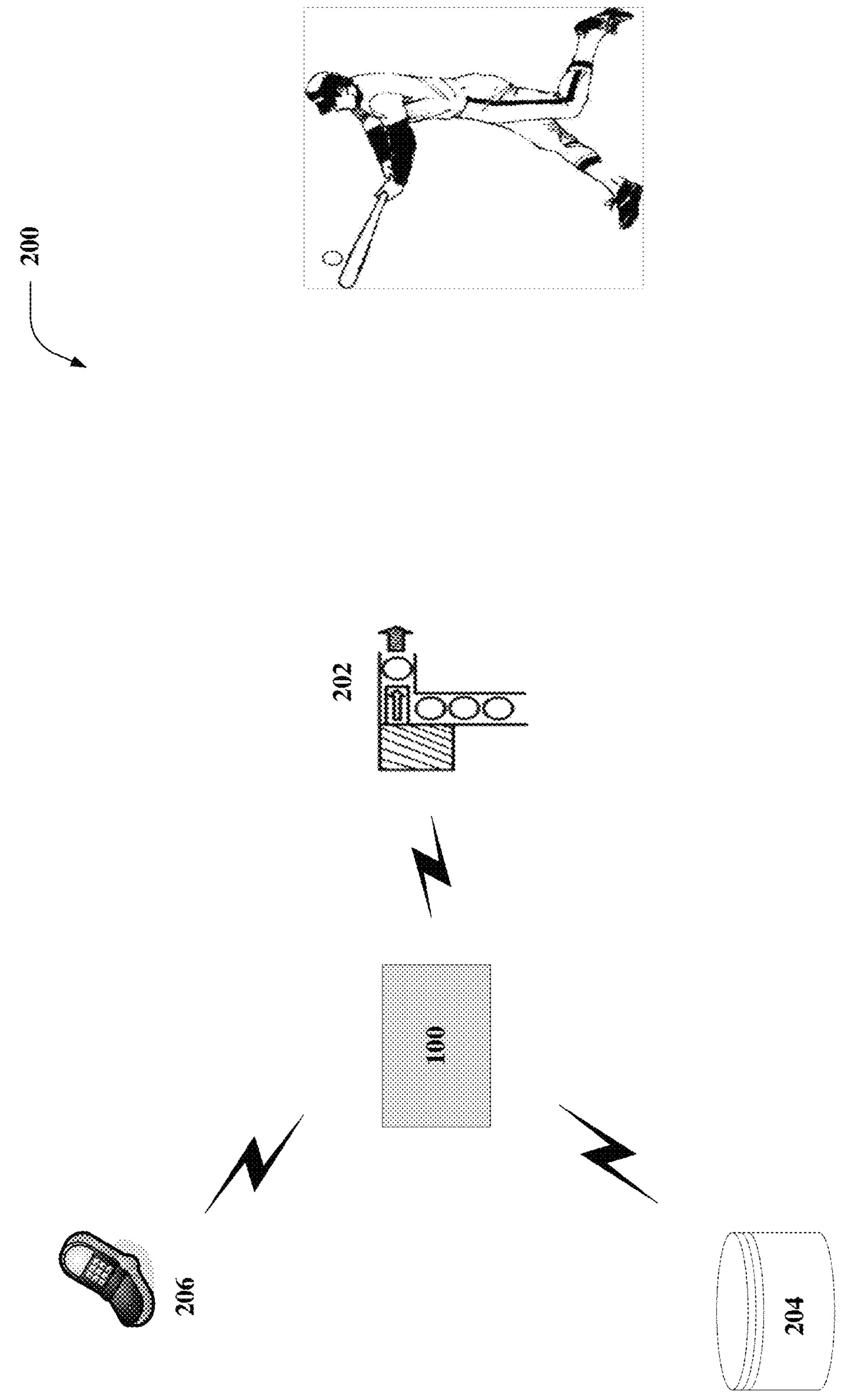
FIG. 2 illustrates an example wireless network performing baseball virtualization according to one or more embodiments.

Referring now to FIG. 2, illustrated is an example wireless network performing baseball virtualization according to one or more embodiments. System 200 can comprise a mobile device 206, a data store 204, the baseball gamification system 100, and the pitching machine 202. Repetitive description of like elements employed in other embodiments described herein is omitted for sake of brevity.

The baseball gamification system 100 can receive input data from the mobile device 206. For instance, the input data can be representative of a user profile. The user profile can indicate that the user is a medium experience hitter. Therefore, in response to this data, the baseball gamification system can select a medium experience rating for baseballs to be pitched from the pitching machine 202 (e.g., maybe 50-70 mph balls instead of 70-90 mph balls). Alternatively, the data store 204 can provide data to the baseball gamification system 100 to further individualize the user's experience. For example, the data store 204 can provide pitching data based on another user's pitch session earlier in the week. It should be noted that the aforementioned data communicated to the baseball gamification system 100 can also communication back to the mobile device 206 during and/or after the session is complete so that the user's profile is updated, thereby providing the user with a means of tracking his data and another starting point during his next session.

Figure 3:
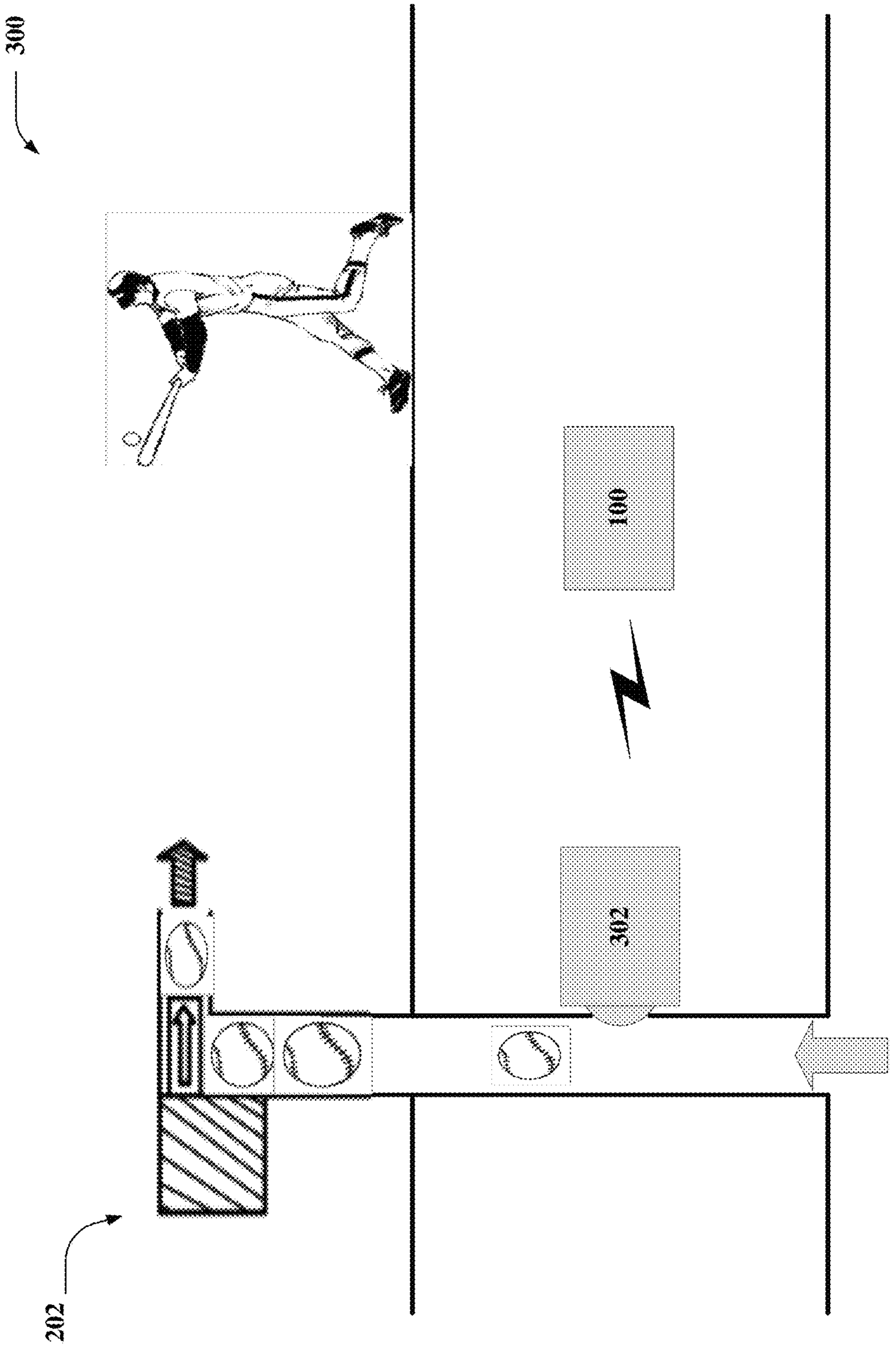
FIG. 3 illustrates an example wireless network performing baseball pitches according to one or more embodiments.

Referring now to FIG. 3, illustrated is an example wireless network performing baseball pitches according to one or more embodiments. System 300 can comprise the baseball gamification system 100, the pitching machine 202, and an RFID tag reader 302. Repetitive description of like elements employed in other embodiments described herein is omitted for sake of brevity.

The pitching machine 202 can receive baseballs from an underground feeder, which can collect the baseballs from the field as will be discussed later. Each baseball can have its own RFID tag to facilitate tracking of a hit baseball. A baseball's RFID tag can be read by the RFID tag reader 302 prior to it being pitched to the user. This data can then be communicated to and stored by the baseball gamification system 100. Additionally, once the baseball has been struck by the batter, another RFID tag reader 302 on or near the field can determine where the baseball has landed. This data can also be communicated to the baseball gamification system, thus giving the batter a way of keeping track of his baseball in the midst of other baseballs being hit onto the same field.

Figure 4:
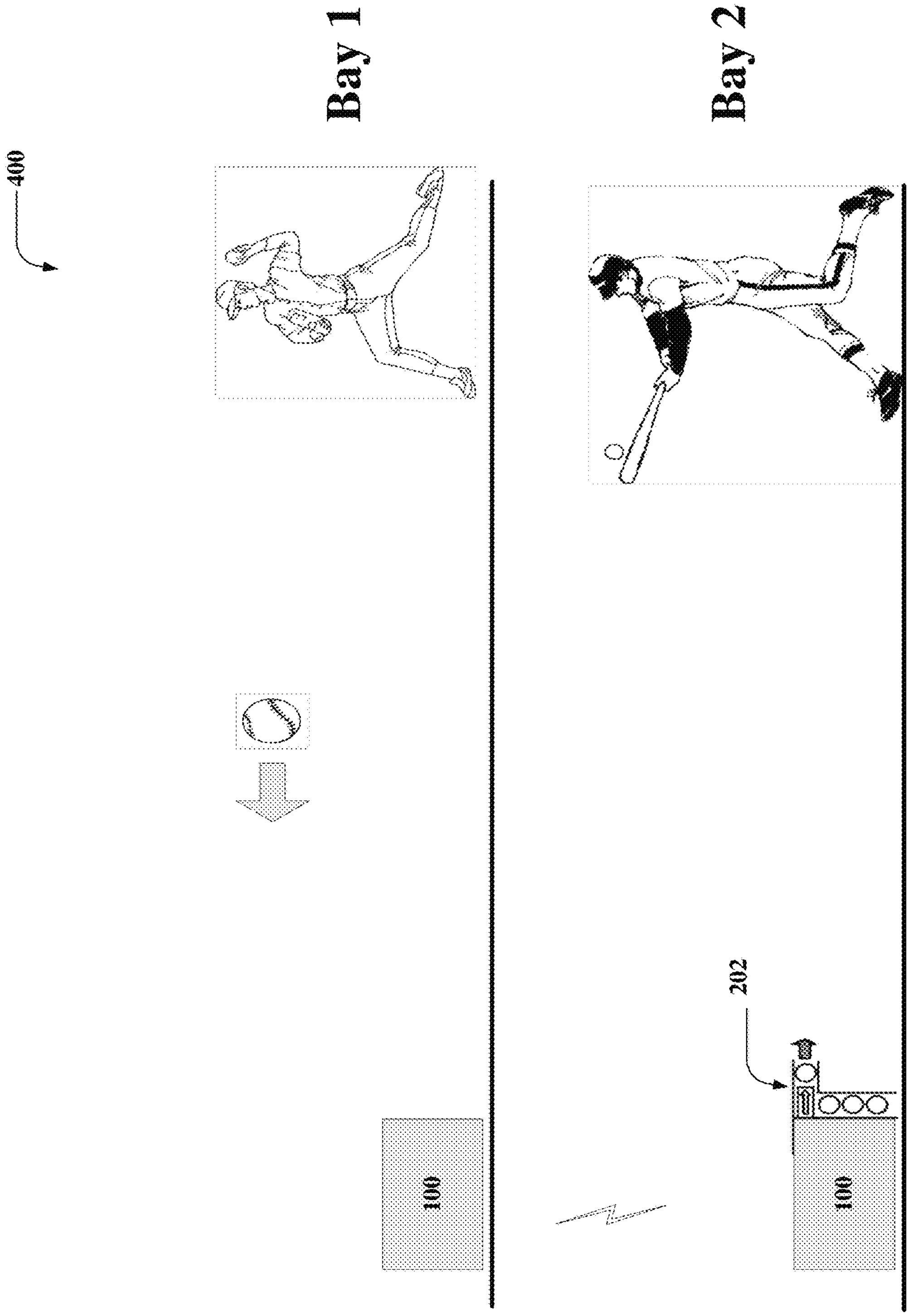
FIG. 4 illustrates an example system for performing baseball pitching and hitting virtualization according to one or more embodiments.

Referring now to FIG. 4, illustrated is an example system for performing baseball pitching and hitting virtualization according to one or more embodiments. Real-time or near real-time games can be facilitated by the system 400. Repetitive description of like elements employed in other embodiments described herein is omitted for sake of brevity.

System 400 can comprise a first baseball gamification system 100 in bay 1 and a second baseball gamification system in bay 2. In bay 1 a baseball can be pitched by a first user. The pitch data associated with that pitch can then be received by the first baseball gamification system 100. In one embodiment, an RFID tagged baseball can be thrown past and RFID tag reader(s) 302 allowing the baseball gamification system 100 to capture metrics associated with the pitch (e.g., speed, curve, trajectory, etc.). In another embodiment, a video camera can capture this data as the ball is thrown past the first baseball gamification system 100. It should be noted that any methodology, which can be used to capture the pitch metrics can be used. Once this data is collected, it can be sent over to the second baseball gamification system 100 in bay 2, which can then pitch a ball, to the second user, from the pitching machine 202 with the same metrics as the ball that was pitched by the first. For example, if the first user pitched a 90 mph curveball, then the pitching machine 202 will pitch a 90 mph curveball. It should be understood that the two bays can be at the same facility or at geographically remote facilities.

Figure 5:
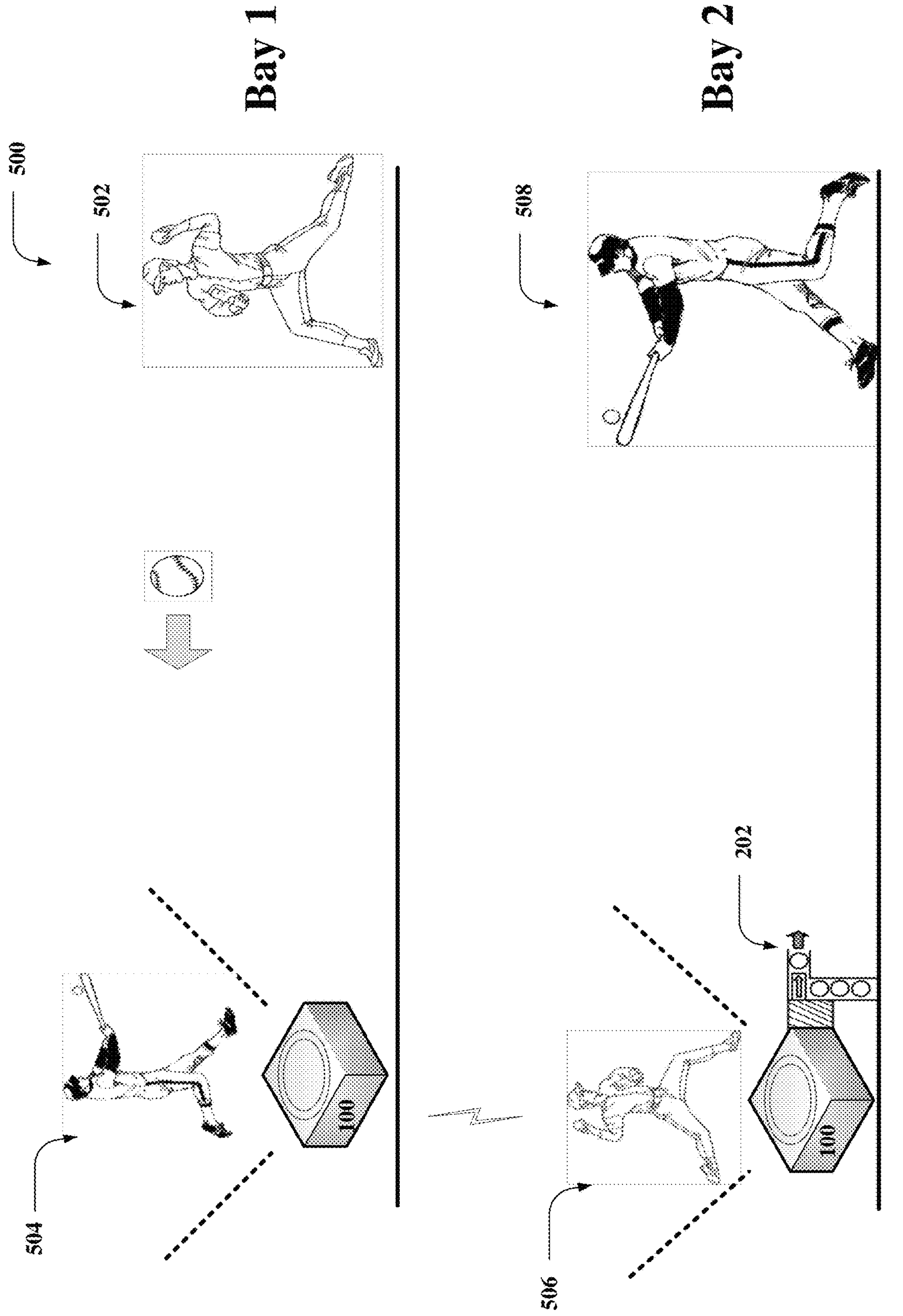
FIG. 5 illustrates an example system for performing baseball pitching and hitting virtualization comprising virtual images according to one or more embodiments.

Referring now to FIG. 5, illustrated is an example system for performing baseball pitching and hitting virtualization comprising virtual images according to one or more embodiments. In accordance with system 500, the baseball gamification system 100 can comprise a virtualization component. Repetitive description of like elements employed in other embodiments described herein is omitted for sake of brevity.

Assuming the same scenario as reference in FIG. 4, a first user 502 can pitch against a second user 508. However, in this scenario a visual of the users can be displayed by the baseball gamification system 100. For instance, the first baseball gamification system 100 in bay 1 can display an image 504 of the second user 508. Conversely, the second baseball gamification system 100 in bay 2 can display an image 506 of the first user 502. It should be understood that the images 504, 506 can be real-time, near real-time, or historical video captures from a previous session. Therefore, as the second user 508 bats against a simulated pitch of the first user 502, he will see an image 506 of the first user 502 as the baseball is pitched by the pitching machine 202.

Figure 6:
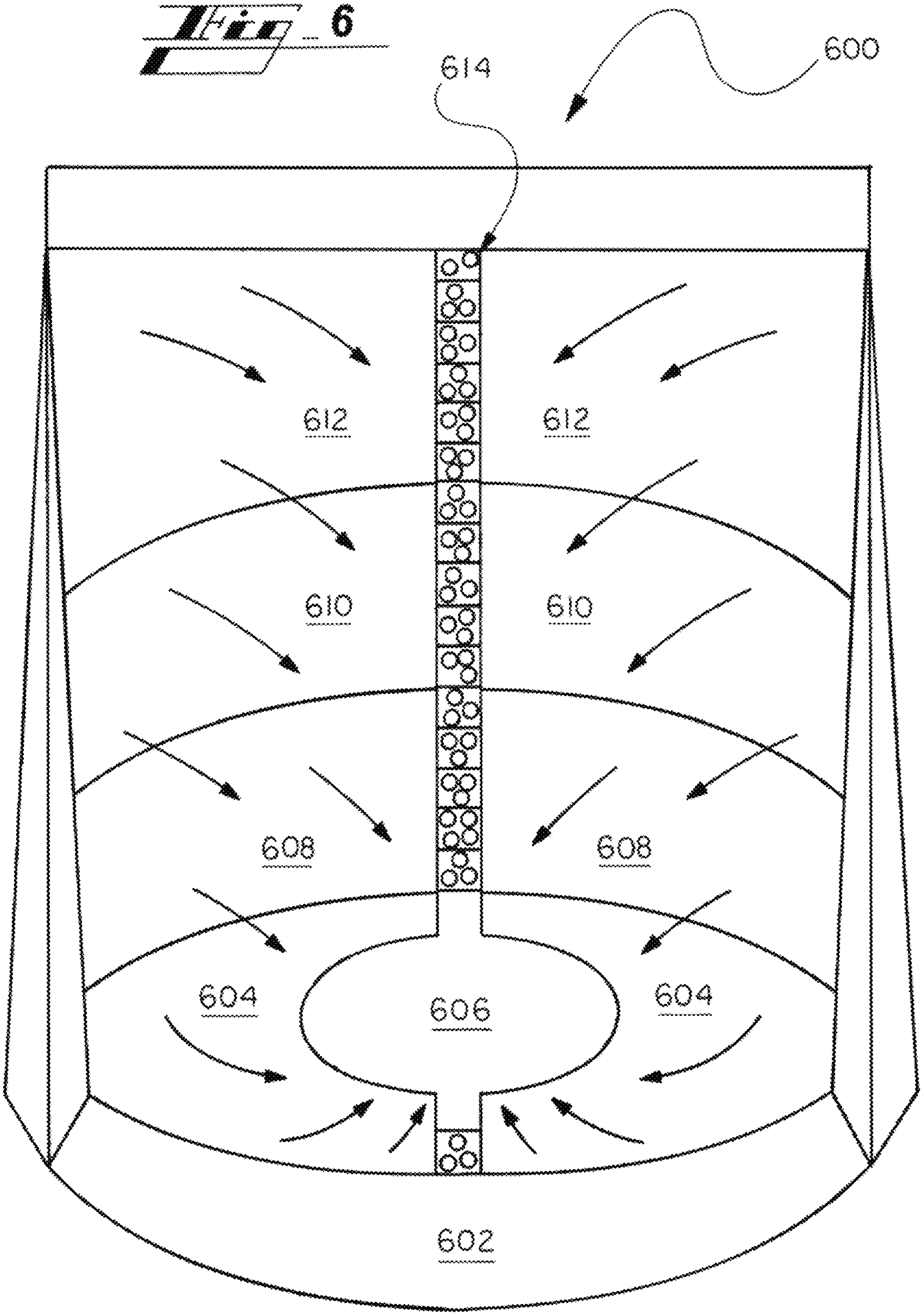
FIG. 6 illustrates an example baseball retrieval field system according to one or more embodiments.

Referring now to FIG. 6, illustrated is an example baseball retrieval field system according to one or more embodiments. The field 600 can comprise several field sections 604, 608, 610, 612 representing several distances from the bay 602. The several field sections 604, 608, 610, 612 can also be sloped inward towards a conveyor belt 614. The sloped field sections 604, 608, 610, 612 can comprise a slope at an angle to ensure that any baseball hit onto the field can roll onto the conveyor belt 614. In this embodiment, baseballs that are hit onto the field 600 can gradually roll to the conveyor belt 614, where they can be transported back to pitching machines that can be located at field section 606.

Figure 7:
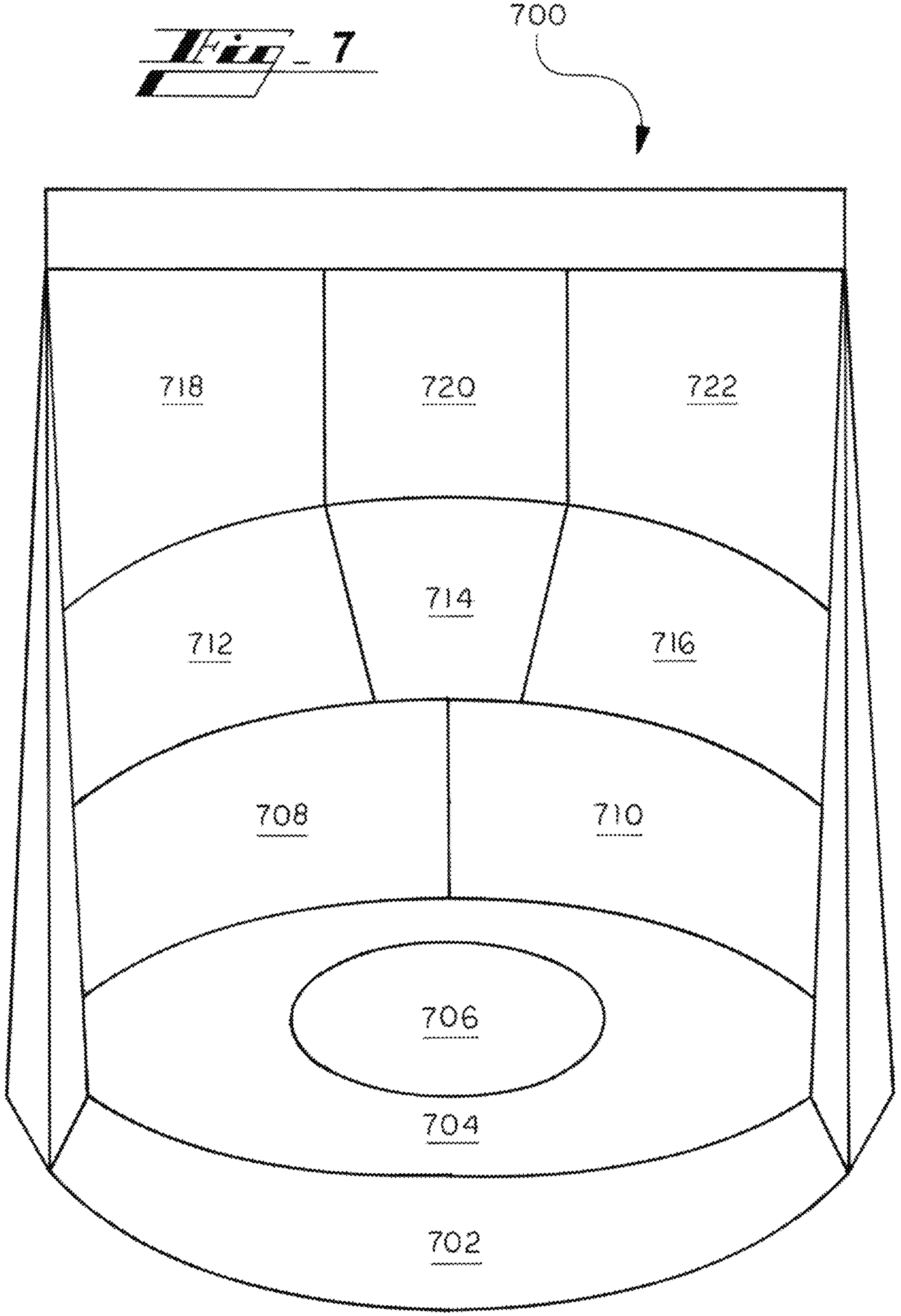
FIG. 7 illustrates an example baseball field gamification system according to one or more embodiments.

Referring now to FIG. 7, illustrated is an example baseball field gamification system according to one or more embodiments. In accordance with the baseball gamification system, the field 700 can be partitioned to into sections 704, 708, 710, 712, 714, 716, 718, 720, 722 to facilitate a point-based game. It should be understood that this is but one configuration of many that are possible. In this embodiment, a baseball that is pitched from section 706 to a bay location at section 702, can then be hit by a user. The user can attain points for hitting the baseball into specific sections of the field 700. For instance, to test distance, a user can receive more points for hitting a baseball into sections 718, 720, 722 than he might receive for hitting a baseball into section 708. Alternatively, if a user wants to test accuracy, then he can set the baseball gamification system point scales so that he is given more points for hitting the baseball exactly into section 712. Additionally, another point system can be provided for a ball that is initially hit into section 716 but then rolls into section 722.

Figure 8:
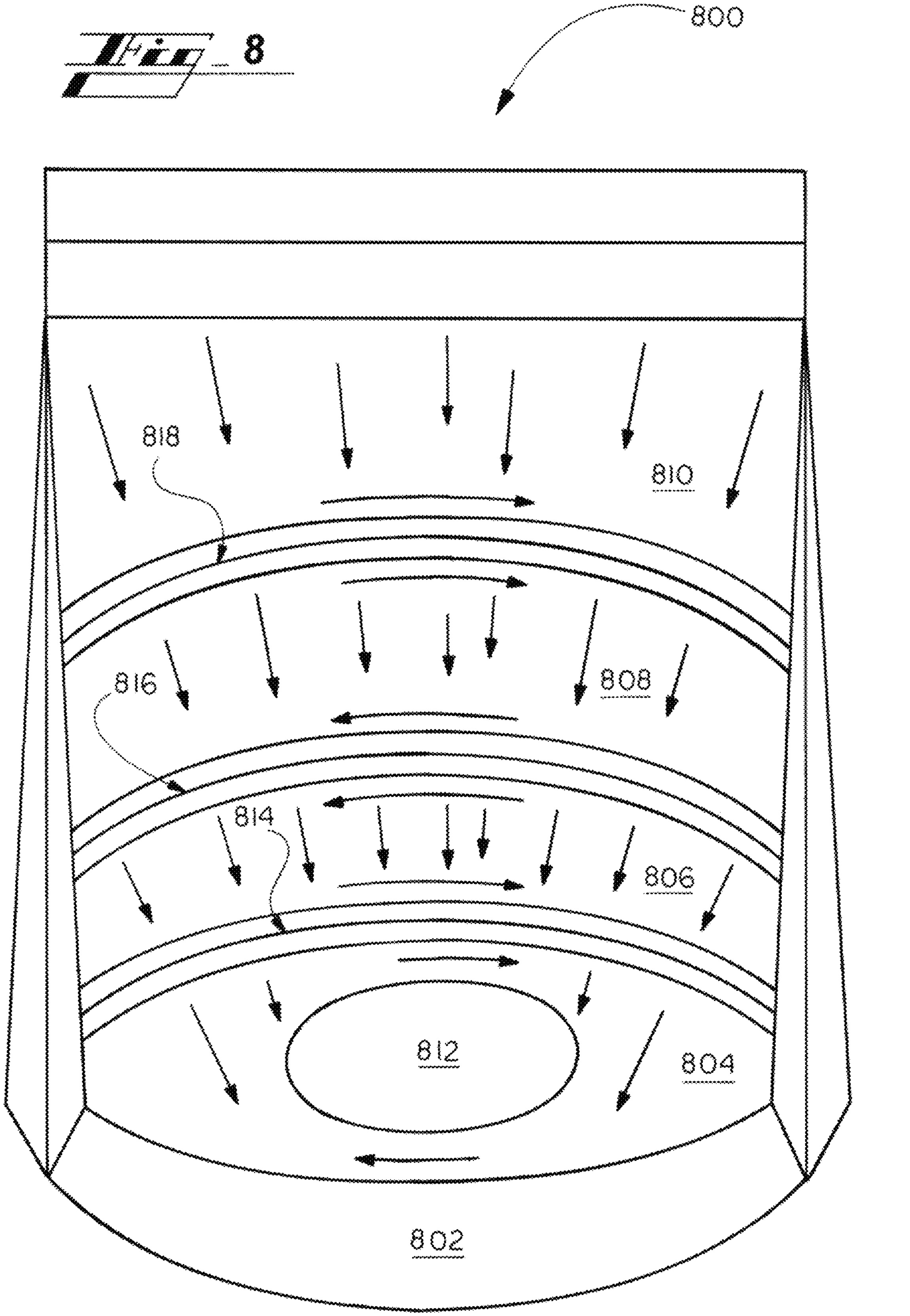
FIG. 8 illustrates an example baseball retrieval field system according to one or more embodiments.

Referring now to FIG. 8, illustrated is an example baseball retrieval field system according to one or more embodiments. In an alternative embodiment, a ball retrieval system an comprise a vertically sloped field 800 with horizontal conveyor belts (in reference to the bay 802). If a baseball is pitched from a pitching location 812 to the bay 802, the baseball could be hit into section 804 of the field 800. The section 804 can be circularly sloped and the pitching location 812 can comprise a recess to allow the baseball to roll into down. If the baseball is hit into section 806, then the vertical slope of section 806 can facilitate the baseball rolling onto a conveyor belt 814. In like manner, a ball hit into section 808 and section 810 can roll onto conveyor belt 816 and conveyor belt 818, respectively, due to the slope of the sections 808, 810.

Figure 9:
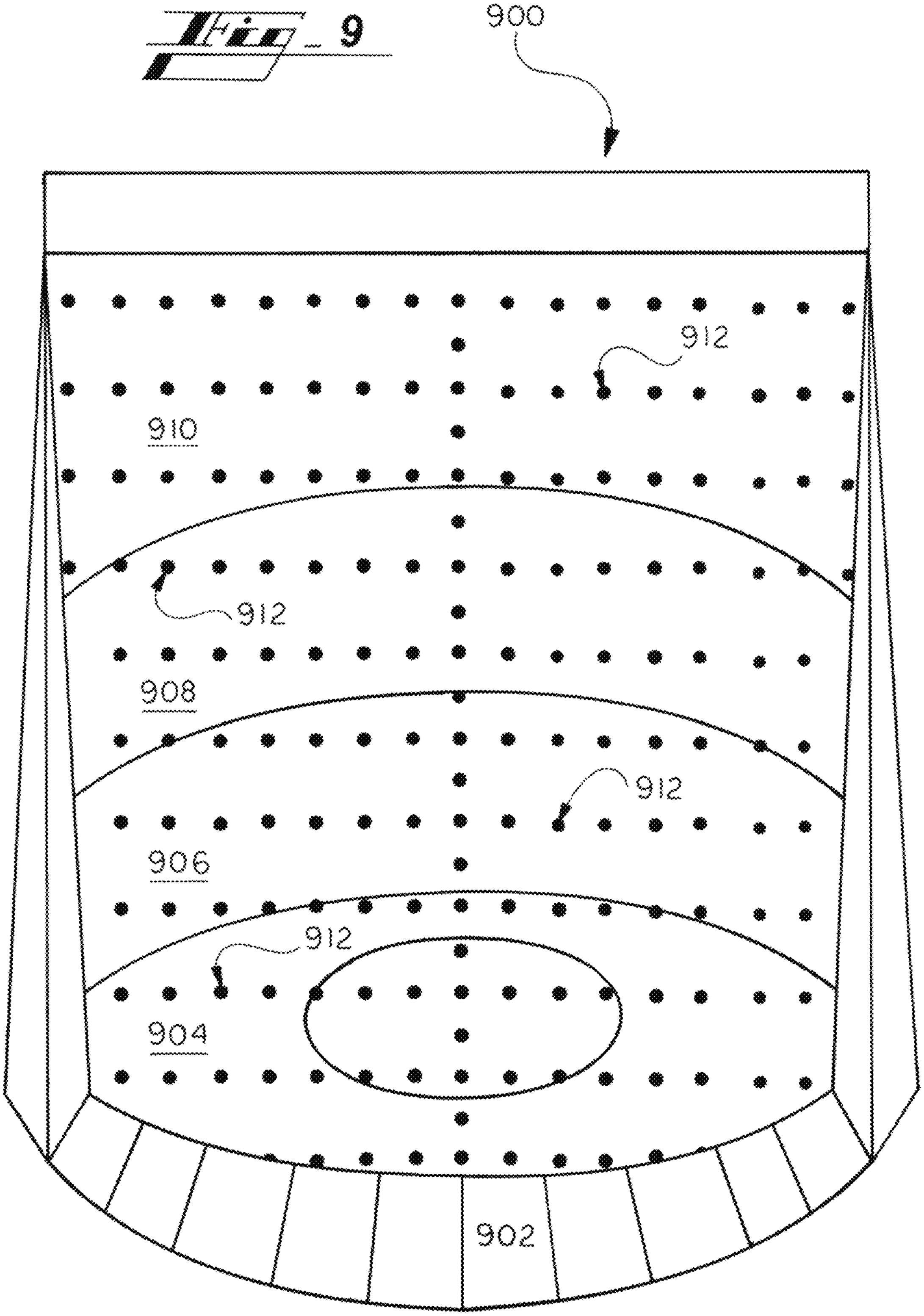
FIG. 9 illustrates an example baseball field gamification system according to one or more embodiments.

Referring now to FIG. 9, illustrated is an example baseball field gamification system according to one or more embodiments. RFID tag readers 912 (or other types of sensor readers) can be placed throughout the field 900. Upon a baseball entering a section 904, 906, 908, 910 of the field 900, the RFID tag readers 912 can read the RFID tag associated with the baseball and communicate this data to the baseball gamification system 100 so that the hitter of the ball knows exactly where his ball has landed and/or rolled to. Additionally, the RFID tag readers 912 can be instrumental in facilitated the point-based system as mentioned above. It should also be noted that pressure sensors, video, GPS, etc. can also facilite the point-based system. For instance, a baseball hit from bay 902 can make contact with an RFID tag reader 912 in section 908 and then come to rest at another RFID tag reader 912 in section 910. This can indicate that the baseball initially land in section 908 and rolled to section 910. Therefore, the path between the two RFID tag readers 912 can be estimated. Alternatively, since the baseball could have rolled over several other RFID tag readers 912 between its initial landing and final resting point then the path of the baseball can be detected more accurately. It should be noted that the accuracy and/or estimating of the actual path of the baseball from landing to resting can be dependent on how closely the RFID tag readers 912 are place together. Therefore, a hybrid methodology can be used to determine a path where only data from some RFID tag readers 912 is leveraged.

Figure 10:
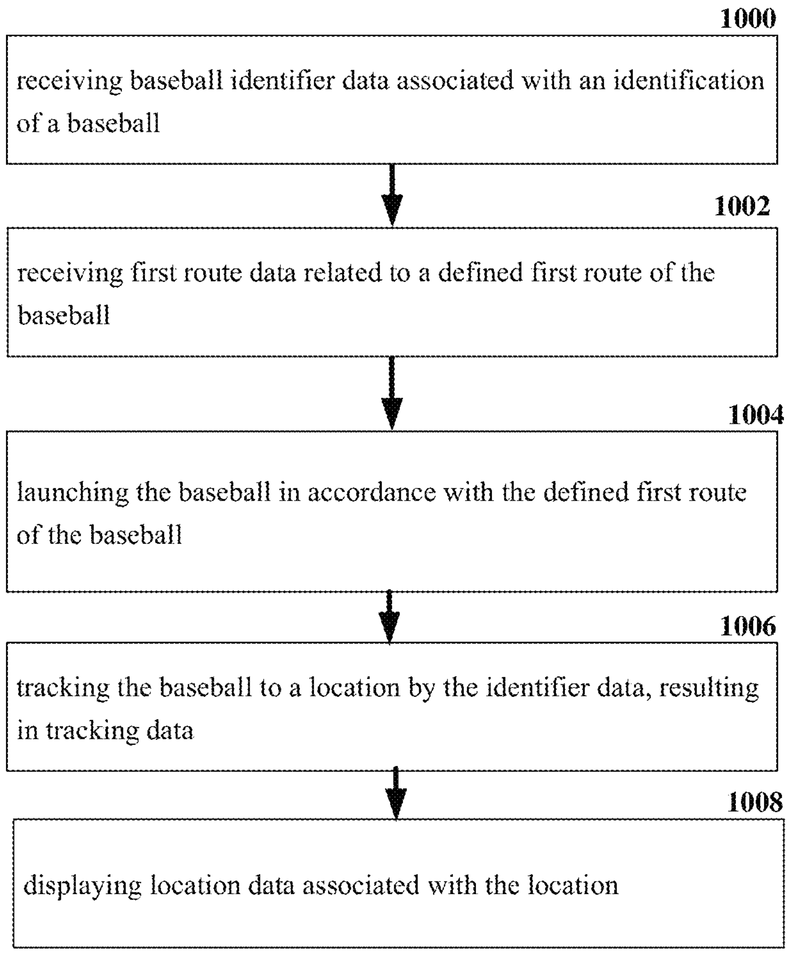
FIG. 10 illustrates an example schematic system block diagram for tracking a baseball according to one or more embodiments.

Referring now to FIG. 10, illustrated is an example schematic system block diagram for tracking a baseball according to one or more embodiments. At element 1000, a wireless network device can receive baseball identifier data associated with an identification of a baseball (e.g., via the detector component 106). The wireless network device can also receive first route data related to a defined first route of the baseball at element 1002 (e.g., via the input component 102). Additionally, the wireless network device can launch the baseball in accordance with the defined first route of the baseball at element 1004 (e.g., via the detector component 106), and track the baseball to a location by the identifier data at element 1006 (e.g., via the detector component 106), resulting in tracking data. Furthermore, the wireless network device can display location data associated with the location at element 1008 (e.g., via the imaging component 116).

Figure 11:
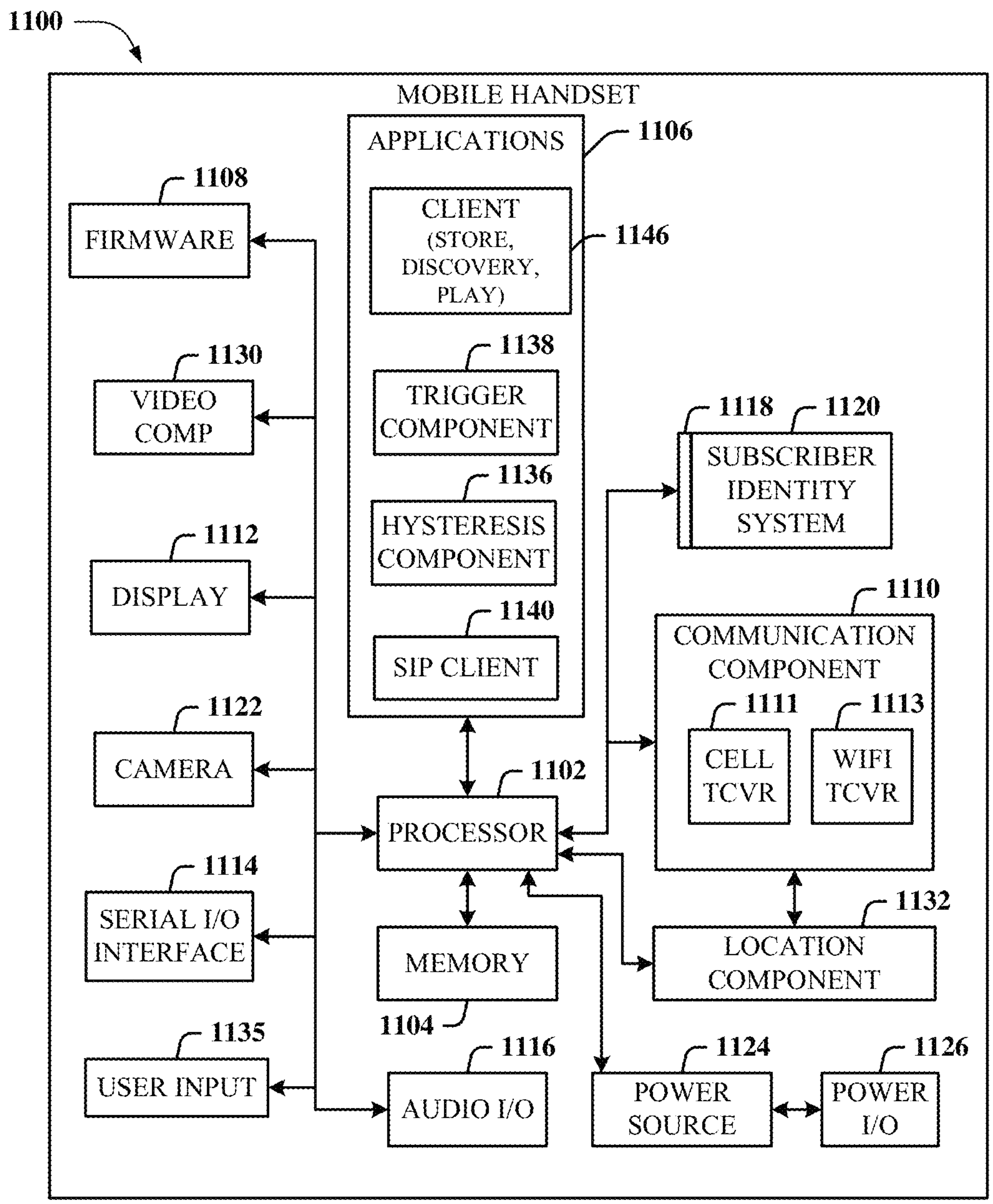
FIG. 11 illustrates an example block diagram of an example mobile handset operable to engage in a system architecture that facilitates secure wireless communication according to one or more embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 1100 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 1110, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
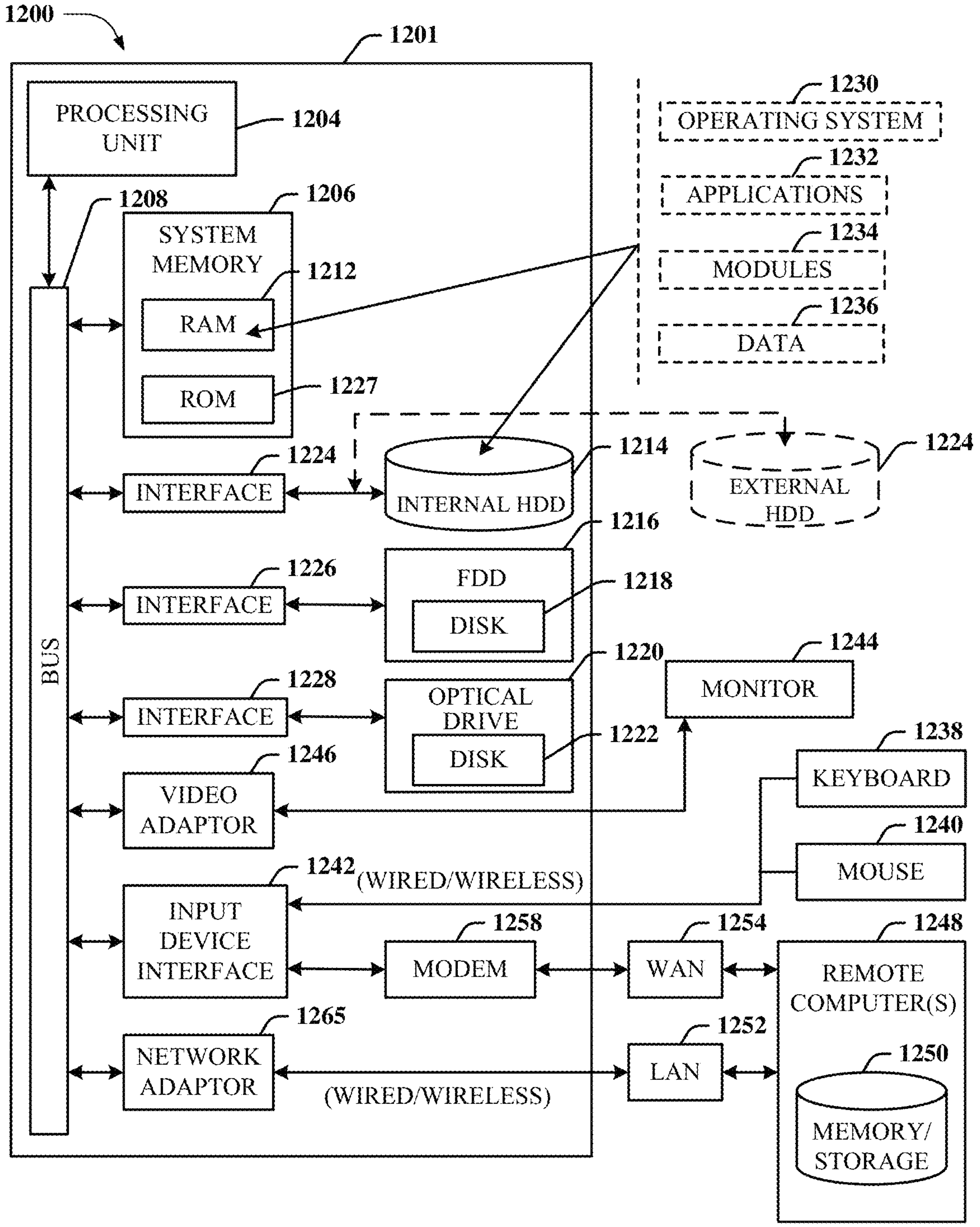
FIG. 12 illustrates an example block diagram of an example computer operable to engage in a system architecture that facilitates secure wireless communication according to one or more embodiments described herein.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1227 and random access memory (RAM) 1212. A basic input/output system (BIOS) is stored in a non-volatile memory 1227 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the input device interface 1242. In a networked environment, program modules depicted relative to the computer, or portions thereof, can be stored in the remote memory/ storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

receiving, by a wireless network device comprising a processor, baseball identifier data associated with an identification of a baseball;

receiving, by the wireless network device, in-game offensive statistics of a baseball team, wherein the in-game offensive statistics comprise pitch data representative of a pitch of a pitcher of the baseball team;

receiving, by the wireless network device, in-game defensive statistics of a baseball team, wherein the in-game defensive statistics comprise a catch statistic associated with a location of a baseball field;

launching, by the wireless network device, the baseball in accordance with the pitch data;

tracking, by the wireless network device, the baseball to the location by the identifier data; and based on the catch statistic and the location, generating, by the wireless network device, a baseball disposition.

2. The method of claim 1, further comprising:

based on the tracking, generating, by the wireless network device, route data associated with a route of the baseball.

3. The method of claim 2, wherein the baseball identifier data comprises radio frequency identifier data associated with a radio frequency identifier tag.

4. The method of claim 2, wherein the tracking comprises tracking a trajectory of the baseball.

5. The method of claim 2, wherein the tracking comprises tracking a velocity of the baseball.

6. The method of claim 4, further comprising:

sending, by the wireless network device, the location data, the tracking data, disposition data representative of the baseball disposition, and trajectory data associated with the trajectory of the baseball to a first user identity associated with a first mobile device.

7. The method of claim 6, further comprising:

sending, by the wireless network device, the location data, the tracking data, and the trajectory data to a second user identity associated with a second mobile device.

8. The method of claim 7, further comprising:

receiving, by the wireless network device, other location data, other tracking data, and other trajectory data from the second mobile device associated with the second user identity.

9. A system, comprising:

a processor; and a memory that stores executable instructions that, when executed by the processor, facilitate performance of operations, comprising:

receiving real defensive statistics of a baseball team;

receiving real pitch statistics of a pitcher of the baseball team;

receiving identification data associated with a baseball;

launching the baseball to a batter in accordance with the real pitch statistics of the pitcher;

tracking, by the identification data, the baseball to a location;

based on the location and the real defensive statistics, generating a baseball outcome; and displaying, via mobile device of the batter, the baseball outcome and location data associated with the location of the baseball.

10. The system of claim 9, wherein the identification data comprises radio frequency identification data.

11. The system of claim 10, wherein the real pitch statistics comprise trajectory data associated with a trajectory of the baseball and speed data associated with a speed of the baseball.

12. The system of claim 11, wherein the launching the baseball in accordance with the real pitch statistics comprises simulating the trajectory and the speed of a previous baseball pitched by the pitcher.

13. The system of claim 9, wherein the identification data comprises video tracking data.

14. The system of claim 9, wherein the location data comprises distance data associated with a distance between a final location of the baseball and a defined location of the second baseball.

15. A non-transitory machine-readable storage medium, comprising executable instructions that, when executed by a processor, facilitate performance of operations, comprising:

receiving baseball identifier data associated with an identification of a baseball;

receiving pitch data associated with a previous pitch of a baseball during a professional baseball game;

receiving defense data representative of a defense during the professional baseball game;

launching the baseball in accordance with the pitch data;

in response to a batter hitting the baseball, tracking the baseball to a location by the identifier data; and based on the location and the defense data, generating a disposition to be displayed on a mobile device of the batter.

16. The machine-readable storage medium of claim 15, wherein the pitch data comprises angle data associated with a pitching angle of the baseball.

17. The machine-readable storage medium of claim 15, wherein the pitch data comprises top speed data associated with a top speed for launching the baseball.

18. The machine-readable storage medium of claim 15, wherein the tracking the baseball to the location comprises utilizing video data associated with a video capture of the baseball.

19. The machine-readable storage medium of claim 15, wherein the tracking the baseball the location comprises utilizing radio frequency identifier data associated with a radio frequency identifier tag of the baseball.

20. The machine-readable storage medium of claim 15, wherein the operations further comprise:

in response to the tracking the baseball to the location, generating swing data associated with a swing of a bat of the batter contacting the baseball to reverse a direction of the baseball.

* * * * *